A. BENSON.
TRANSMISSION GEARING.
APPLICATION FILED SEPT. 5, 1911.

1,030,379.

Patented June 25, 1912.

2 SHEETS—SHEET 1.

Witnesses:
Chas. E. Gorton
H. W. Munday

Inventor.
Andrew Benson
By Munday, Evarts, Adcock & Clarke
Attys.

A. BENSON.
TRANSMISSION GEARING.
APPLICATION FILED SEPT. 5, 1911.

1,030,379.

Patented June 25, 1912.

2 SHEETS—SHEET 2.

Witnesses:

Inventor:
Andrew Benson
By Munday, Evarts, Adcock & Clarke,
Attys.

UNITED STATES PATENT OFFICE.

ANDREW BENSON, OF CHICAGO, ILLINOIS, ASSIGNOR, BY MESNE ASSIGNMENTS, TO BENSON GEAR COMPANY.

TRANSMISSION-GEARING.

1,030,379.  Specification of Letters Patent.  Patented June 25, 1912.

Application filed September 5, 1911. Serial No. 647,623.

*To all whom it may concern:*

Be it known that I, ANDREW BENSON, a citizen of the United States, residing in Chicago, in the county of Cook and State of Illinois, have invented a new and useful Improvement in Transmission-Gearing, of which the following is a specification.

This invention relates to improvements in transmission gearing and particularly to that class of transmission gearing used in connection with automobiles for driving the axle shafts and one in which is employed a driving worm and a worm-gear coöperating therewith. Heretofore in transmission gearing of this type it has been customary to use on the driving shaft a worm of the ordinary type having a constant diameter throughout its length, which meshes with a coöperating worm-gear, for operating the axle shafts through means of compensating gearing, and in this form of transmission gearing the worm and worm-gear have borne a fixed relation without any allowance being made for wear.

My object is to provide a structure, and herein my invention consists, that overcomes this defect by providing transmission gearing comprising a worm and a worm-gear which shall be freely and automatically adjustable relatively to each other so as to compensate for all wear and so that the operating gears will automatically assume the most efficient operating position.

More specifically my invention consists in a driving shaft having a worm fixed thereon and having bearings in a housing pivotally or swively mounted at an angle to the worm-gear, preferably about a center passing through the outer circumference of the worm-gear, said housing having a slidable and dust proof engagement with the worm-gear housing, and compensating gearing between the worm-gear and the axle shafts.

Other minor details of the invention will be more specifically pointed out and in part obvious from the following description.

My invention furthermore consists in the novel construction of parts and devices and in the novel combination of parts and devices as herein shown, described and claimed.

Figure 1:
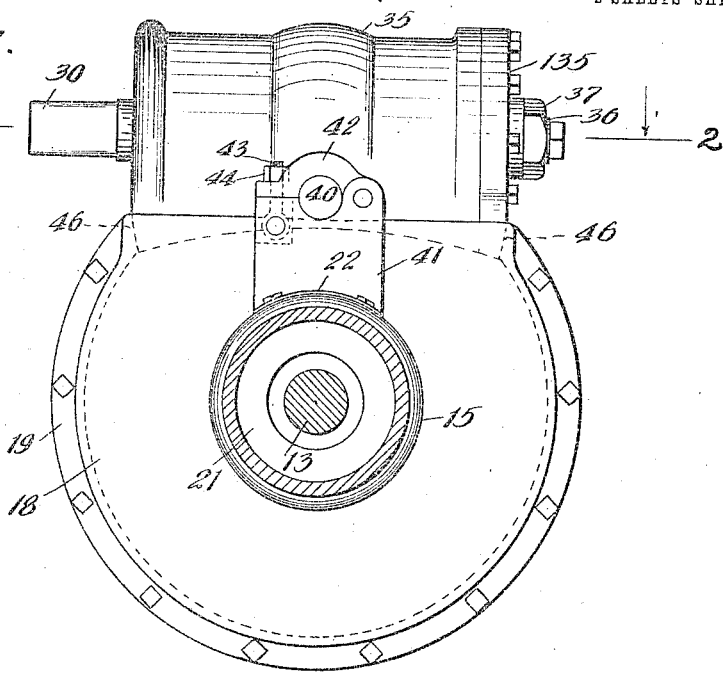
Figure 2:
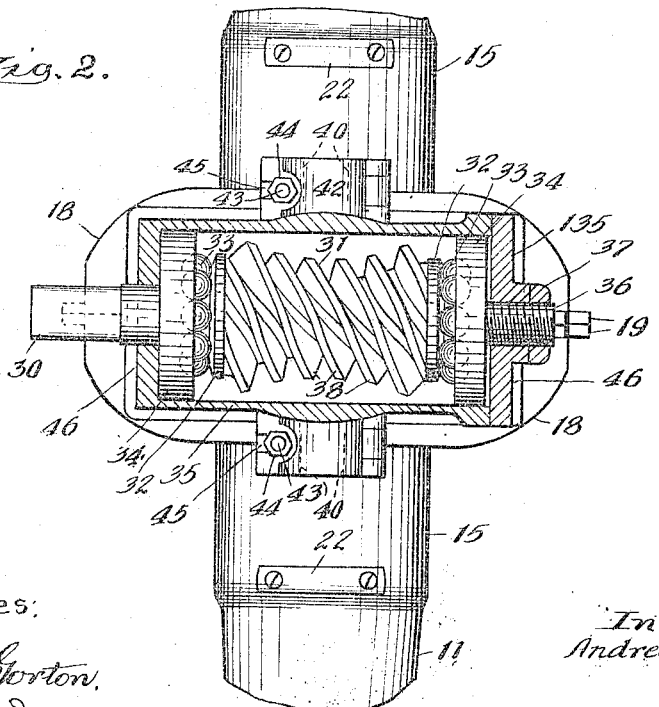
Figure 3:
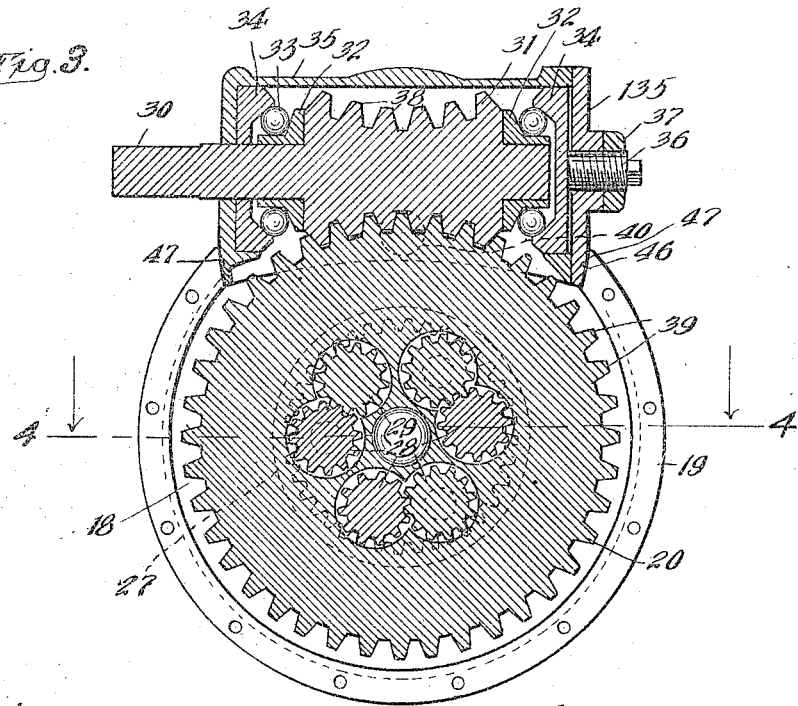
Figure 4:
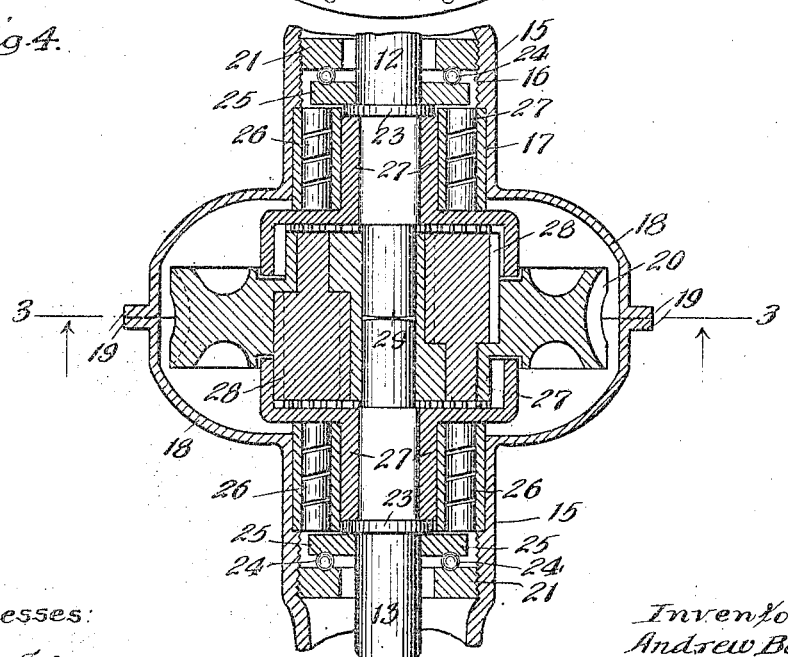

In the drawings forming a part of this specification, Figure 1 is a side elevation of a structure embodying my improvements, showing in section the casing such as would be used when the improvement is applied to an automobile axle. Fig. 2 is a horizontal section taken on the line 2—2 of Fig. 1. Fig. 3 is a vertical section taken on the line 3—3 of Fig. 4 and Fig. 4 is a horizontal section taken substantially on the line 4—4 of Fig. 3.

In the drawings the reference numeral 11 denotes the axle casings or tubes such as are used in automobiles, for the two members 12 and 13 of a common type of two part axle shaft. The casings or tubes 11 are each enlarged at their inner ends as shown at 15 and provided with inner threaded portions 16, smooth portions 17, and flared mouths 18 having flanges 19 thereon adapted to be bolted together to form a housing or casing for the worm-gear 20 and the compensating or balancing gears coöperating therewith. In each threaded portion 16 is adjustably mounted a thrust bearing plate 21 adapted to be retained in position by members 22. Between each plate 21 and the collars 23 on the shaft members 12 and 13 are anti-friction balls 24 and plates 25. Mounted in the smooth portions 17 of the casings are anti-friction roller bearing devices 26 adapted to support and center the internal gear members 27 on the inner end of each axle shaft. Coöperating with the internal gears of the members 27 are compensating or balancing gears 28, preferably three in number, mounted in the worm-gear 20, which is located between the shell members 27 and rotatable on the reduced ends 29 of the shaft members 12 and 13. It is obvious that other forms of compensating or balancing gearing may be substituted for that which I have described, the essential features connected with my invention being that the power shall be transmitted to the axle shafts from a driven gear.

On the end of the member 30, forming a part of the driving shaft, is formed a worm 31 and said member 30 and the worm 31 are mounted in a housing 35 having a removable end plate 135, by means of anti-friction cone bearings, each bearing comprising a bearing plate 32, anti-friction balls 33, and a conical plate 34, the conical plate opposite the end of the worm 31 being adjustable as by means of a screw 36 and set nut 37, as more clearly shown in Figs. 2 and 3. The worm is preferably of that type known as the Hindley screw and as shown may be provided with a plurality of threads 38 meshing with the teeth 39 on the worm-gear 20.

To compensate for wear on the interengaging threads and teeth, the worm housing 35 is movably mounted relatively to the worm-gear housing and this movement is permitted preferably only in a plane at right angles to the axis of the worm-gear or, in other words, in the plane of the worm-gear. The structure which I have shown for accomplishing this result and which may be greatly varied comprises shafts 40 formed on each side of the housing 35 preferably integrally therewith and extending at right angles thereto and in line with each other, said shafts being journaled in journal boxes on each side of the worm-gear casing, each journal box comprising a vertically extending member 41 and a member 42 pivoted thereto and retained in position on the shaft by a pivoted bolt 43 having a nut 44 thereon and working in a slot 45 in the pivoted member 42. The center of these shafts and therefore the axis about which the housing 35 oscillates preferably coincides with a line passing through the outer circumference of the worm-gear 20 and parallel to the axis of the worm-gear.

The members 18 forming the housing for the worm-gear, are provided with a recess having arcuate faces 46 at each end thereof adapted to coöperate with correspondingly shaped faces 47 on the housing 35, these faces 46 and 47 being struck on arcs of radii having the center of the shafts 40 as their centers and the flat sides of the housing 35 coöperating with the straight portions of the recess in the worm-gear housing as will be easily understood from an inspection of Figs. 1 and 2. With this structure, I provide a close fitting, slidable, dust proof connection between the two relatively movable housings, and it will also be apparent that by the structure described I have provided a very efficient form of transmission gearing that automatically adjusts itself to compensate for wear on the interengaging surfaces and one which may be cheaply manufactured and easily accessible for inspection.

By the use of a worm of the form which I have shown of the Hindley type, many advantages are derived over the use of the old form of worm having a constant diameter, since it is evident that with the structure shown, the wearing or contacting faces on the worm are spread out over a greater area and hence there is less liability for the surfaces to cut each other and in the ordinary worm screw when the threads have been worn down, the faces thereof are not presented to the worm-gear teeth at the most efficient working angle and the efficiency of the power transmission becomes very small. With my structure however, as soon as the worm becomes worn—it adjusts itself automatically to a position where the faces of the worm thread are presented to the faces of the worm-gear teeth, in as an efficient position as before.

Many changes in the details of construction may be made by those skilled in the art and all such changes are contemplated as come within the scope of the appended claims.

I claim:—

1. In a transmission gearing, a shaft having a worm thereon, a worm-gear meshing with said worm, the axis of the worm being angularly movable relatively to the worm-gear about a pivotal axis located intermediate the ends of the worm.

2. In a transmission gearing, a shaft having a worm thereon, a housing for said worm and shaft, a worm-gear and a housing therefor, the two housings with their corresponding gears therein being relatively movable to compensate for wear.

3. In a transmission gearing, the combination of a shaft having a driving gear thereon and a coöperating gear driven thereby, the axis of one being freely and automatically movable relatively to and in a plane perpendicular to the axis of the other.

4. In a transmission gearing, a shaft having a worm thereon, a worm-gear meshing with said worm, the axis of the worm being freely and automatically angularly adjustable relatively to the worm-gear.

5. In a transmission gearing, a shaft having a worm thereon, a housing in which said shaft and worm are mounted, a worm-gear and a housing therefor, the two housings with their corresponding gears therein being freely and automatically movable relatively to each other to compensate for wear.

6. In a transmission gearing, a shaft having a driving worm thereon, a housing in which said shaft and worm are mounted, a worm gear coöperating with the worm, and a housing for said worm-gear, the worm housing being pivotally mounted on the worm-gear housing, the axis of said worm being thereby angularly movable relatively to the worm-gear.

7. In a transmission gearing, a shaft having a driving worm thereon, a housing in which said shaft and worm are mounted, a worm-gear coöperating with the worm, and a housing therefor, the worm housing being freely and pivotally mounted on the worm-gear housing about an axis parallel to the worm-gear axis.

8. In a transmission gearing, a shaft having a driving worm thereon, a housing in which said shaft and worm are mounted, a worm-gear coöperating with said worm, and a housing therefor, the worm housing being freely and pivotally mounted on the worm-gear housing about an axis parallel to the worm-gear axis and passing through the periphery of the worm-gear.

9. In a transmission gearing, a shaft having a worm thereon, a housing in which said shaft and worm are mounted, a worm-gear and a housing therefor, the two housings with their corresponding gears therein being relatively movable to compensate for wear, said housings having a dust-proof slidable connection therebetween.

10. In a transmission gearing, a shaft having a worm thereon, a housing in which said shaft and worm are mounted, a worm-gear coöperating with said worm, and a housing therefor, the worm housing being pivotally mounted on the worm-gear housing, the axis of said worm being thereby angularly movable relatively to the worm-gear, said housings having a slidable dust-proof connection therebetween.

11. In a transmission gearing, a shaft having a driving worm thereon, a housing in which said shaft and worm are mounted, a worm-gear coöperating with the worm and a housing therefor, the worm housing being freely and pivotally mounted on the worm-gear housing about an axis parallel to the worm gear axis and passing through the periphery of the worm gear, said housings each having engaging sliding faces cut on arcs, the radii of which have their centers coinciding with the axis of the pivot of the housings.

12. In a transmission gearing, the combination with a worm, and a housing therefor, of a worm-gear, a housing for said worm gear, and means for pivotally mounting said housings relatively to each other, comprising oppositely extending shafts and two part adjustable journal boxes, said shafts being mounted in said journal boxes.

13. In a transmission gearing for automobiles, a power shaft, a Hindley screw type worm keyed to said shaft, a housing for said worm, a worm-gear coöperating with said worm and a housing for said worm gear, said worm housing being pivoted to the worm gear housing.

ANDREW BENSON.

Witnesses:
H. M. MUNDAY,
JOSEPH HARRIS.